United States Patent [19]

Timberlake

[11] Patent Number: 5,042,670
[45] Date of Patent: Aug. 27, 1991

[54] SUPPORT FOR T. V. CONTROLLER AND PROGRAM GUIDE

[76] Inventor: Bonnie F. Timberlake, 202 11th St., Butner, N.C. 27509

[21] Appl. No.: 609,772

[22] Filed: Nov. 7, 1990

[51] Int. Cl.⁵ .............................................. A47F 7/00
[52] U.S. Cl. ...................................... 211/13; 211/10; 211/40; 248/176; 248/676
[58] Field of Search ................. 211/13, 45, 50, 41, 211/40, 10; 248/676, 176

[56] References Cited

U.S. PATENT DOCUMENTS

| | | | |
|---|---|---|---|
| 4,044,980 | 8/1977 | Cummins | 248/676 X |
| 4,259,568 | 3/1981 | Pynesen | 248/676 X |
| 4,660,792 | 4/1987 | Rogalski . | |
| 4,815,683 | 3/1989 | Ferrante | 248/309.1 X |
| 4,821,889 | 4/1989 | Cohen | 211/13 |
| 4,824,059 | 4/1989 | Butler . | |
| 4,838,505 | 6/1989 | Lowe . | |
| 4,848,609 | 7/1989 | Meghnot . | |
| 4,852,746 | 8/1989 | Wells et al. . | |
| 4,856,658 | 8/1989 | Novak | 211/13 |

Primary Examiner—Robert W. Gibson, Jr.

[57] ABSTRACT

A rack structure constructed to support a TV remote controller, a VCR remote controller, a television program listing booklet, and a plurality of VCR cartridges. The rack structure can be positioned near a chair or couch occupied by a person while viewing a television receiver. Either controller can be operated by the person without removing the controller from the rack structure. Also, the person can read information from the television program booklet to select the program he wishes to turn on with the TV controller.

8 Claims, 1 Drawing Sheet

SUPPORT FOR T. V. CONTROLLER AND PROGRAM GUIDE

BACKGROUND AND SUMMARY OF THE INVENTION

This invention relates to a rack structure usable in conjunction with a television receiver (TV) and video cassette recorder (VCR) to enable the viewer to more easily and effectively control the TV and VCR operations.

The rack structure of this invention has provision thereon for storing two remote controllers for a TV and VCR, such that the controllers are less likely to be lost or mislaid. The controllers are preferably supported on the rack structure so that the person can operate the controllers without removing the controllers from the rack structure. Since there is no need to remove the remote controllers from the rack structure there is a lessened likelihood of the controllers being lost or mislaid.

The rack structure also has provisions for supporting a TV program listing booklet in an opened condition, suitable for convenient reading of the TV programs. The booklet can be placed on the rack structure and opened to the particular page that shows the programs for that day. Each day of the week the pages are turned to have that days' programs available for convenient reading. At the end of the week the booklet is replaced with a new booklet for the coming week. The viewer thus has ready access to all the TV programs for the current week. The TV program listing booklet can stay on the rack structure for an entire week so there is no need to hunt for the current booklet, or take any special precautions against throwing the booklet into the trash.

The rack structure of the invention can also incorporate means thereon for storing a plural number of VCR cartridges immediately alongside the rack area used to support the TV program listing booklet. The VCR cartridge support mechanism preferably takes the form of a series of vertical partitions spaced apart to define upright vertical slots, whereby the cartridges can be stored vertically so that the titles on their edge surfaces can be displayed for easy viewing. The cartridge support mechanism is useful in that it permits the person to have ready access to VCR cartridges of current interest, e.g. cartridges being rented or recently purchased. The cartridges of most interest are in open view, and hence less likely to be mislaid or forgotten.

Devices for storing TV remote controllers are shown in U.S. Pat. No. 4,660,792 to L. Rogalski, U.S. Pat. 4,824,059 to L. Butler, U.S. Pat. No. 4,838,505 to T. Lowe, U.S. Pat. 4,848,609 to R. Meghnot, and U.S. Pat. No. 4,852,746 to E. Wells et al. In each case the storage device holds the remote controllers in a non-operating position; the controller must be removed from the storage device or manually manipulated before it can be used to control a TV or VCR. The storage device of the present invention holds two remote controllers in operating positions ready for use without removal or manual manipulation. Also, the storage device of the present invention includes mechanism for supporting (or storing) a TV program listing booklet and a number of VCR tape cartridges. The storage device of the present invention is believed to have practical advantages over the known prior art storage devices.

THE DRAWINGS

DESCRIPTION OF A PREFERRED EMBODIMENT OF THE INVENTION

Figure 1:
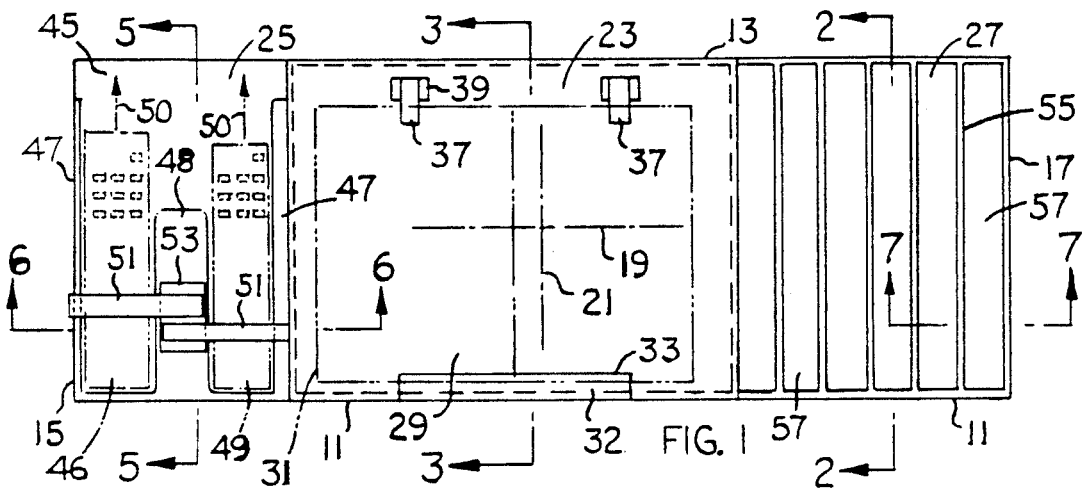
FIG. 1 is a top plan view of a rack structure embodying this invention

FIG. 1 is a top plan view looking down on a rack structure of the present invention. The rack structure comprises a three dimensional structural body having an elongated front edge 11, elongated rear edge 13, and two relatively short side edges 15 and 17. Edges 11 and 13 define a longitudinal axis 19. Edges 15 and 17 define a transverse axis 21.

This three dimensional body has a central section 23 adapted to support a TV program listing booklet, a left end section 25 adapted to support two remote controllers for a TV and a VCR, and a right end section 27 adapted for storage of a multiple number of VCR tape cartridges.

The rack body will be positioned on a table alongside the chair or couch occupied by a person while viewing the television set. The rack body will be oriented alongside the person so that the front edge 11 of the rack body is facing the person and the rear edge 13 of the rack body is facing the television set. With such an orientation the person sitting on the chair or couch will be able to operate either of two remote controllers supported on section 25 of the rack body. One of the controllers will be a TV controller; the other controller will be a VCR controller. The person seated on the chair or couch will at the same time be in position to view a TV program listing booklet supported on central section 23 of the rack body.

Figure 3:
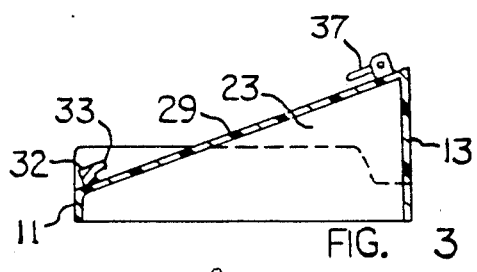
FIG. 3 is a transverse sectional view taken on line 3—3 in FIG. 1.
Figure 5:
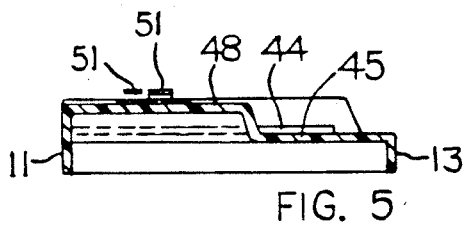
FIG. 5 is a transverse sectional view taken on line 5—5 in FIG. 1.

Rack section 23 has a flat upper face 29 that is slightly inclined from front edge 11 to rear edge 13, such that an opened TV program listing booklet resting on face 29 will be tilted slightly toward the person, making it somewhat easier for the person to read the booklet without removing the booklet from face 29. As shown in FIG. 3, face 29 is inclined at an angle of about twenty degrees; the inclination could be greater if so desired. Dashed line 31 in FIG. 1 designates an opened TV program listing booklet positioned on inclined face 29.

Figure 4:
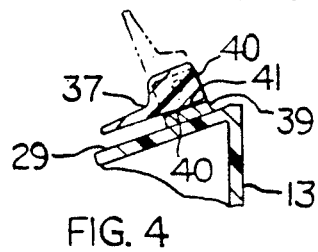
FIG. 4 is a fragmentary enlarged view of a structural detail used in the FIG. 3 construction.
Figure 7:
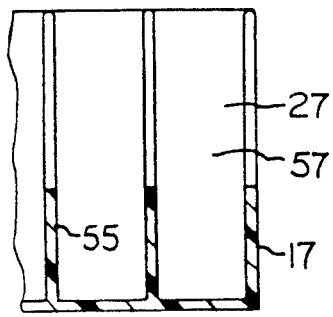
FIG. 7 is an enlarged fragmentary sectional view taken on line 7—7 in FIG. 1.

In order to better retain the TV program listing booklet on inclined face 29, L-shaped strip 32 is secured to face 29 in near proximity and parallel to front edge 11 of the rack body. Strip 32 has a lip 33 spaced above face 29 to overlie the pages of an opened booklet resting on face 29. Further, two pivotable clip structures 37 are mounted on face 29 in near proximity to rear edge 13 of the rack body. Each clip structure is swingably connected to a U-shaped bracket 39 so that the clip structure can have a retracted position extending upwardly away from face 29 (dashed lines in FIG. 4) or an operating position extending along face 29 to overlie the pages of an opened booklet resting on face 29. Each swingable clip structure can be formed of a semi-resilient plastic material so that flat faces 40 on the clip structure can ride over surface 41 of bracket 39 when it is desired to swing the clip structure between its two positions (e.g. when placing a TV booklet on face 29); normally each flat face 40 holds the clip structure in a designated position.

Central section 23 is designed specifically to support a TV program listing booklet, which normally contains the TV listings for one week. After one week of usage the booklet is replaced with a new booklet. The flat face 29 on rack section 23 could be used to support a TV program listing cut from a daily newspaper (if the weekly TV program listing booklet is for any reason not available).

Left end section 25 of the rack body has two flat upwardly-facing controller engagement surfaces 43 defined by sponge rubber pads 44 that are secured to horizontal wall 45 of the rack body. Wall 25 could be a planar extension of face 29 if desired. A TV controller 46 can be positioned flatwise on one of the pads, and a second VCR controller 49 can be positioned flatwise on the other pad. Raised rim walls 47 and central raised wall 48 extend upwardly from horizontal wall 45 to define pocket structures for containing the individual remote controllers 46 and 49. Each controller sits in one of the pocket structures with its signal beam transmission axis 50 extending essentially along a line parallel to the transverse axis 21 of the rack body. With the pushbuttons of each controller facing upwardly, selected pushbuttons can be manually depressed to effectively control the TV or VCR without removing either controller from the associated pocket structure.

Figure 6:
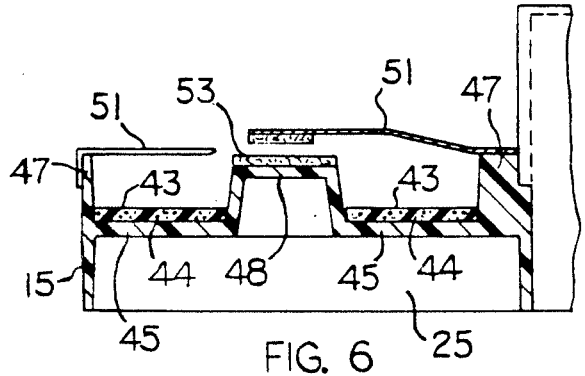
FIG. 6 is an enlarged fragmentary sectional view taken on line 6—6 in FIG. 1.

As seen in FIG. 1, the raised walls 47 and 48 form three-sided pocket structures that partially surround the associated controllers. Two flexible straps 51 are attached to selected ones of the rim walls 47 for extension over the pocket structures to prevent inadvertent upward dislocation of the controllers out of the associated pockets. Each strap 51 can be releasably secured in place by the use of adhesive fibrous pad material marketed under the trade name VELCRO. As shown in FIGS. 1 and 6, a pad 53 of a fibrous adhesive material (e.g. marketed under the name VELCRO) is secured to the central raised wall 48. The free ends of the associated straps 51 have mating (interlockable) fibrous pads secured thereon for releaseable engagement with adhesive pad 53. Each raised wall 47 or 48 will have a height slightly less than the thickness dimension of a remote controller, so that each strap 51 will exert a downward retaining force on the controller, sufficient to keep the controller against sponge rubber pad 44.

Figure 2:
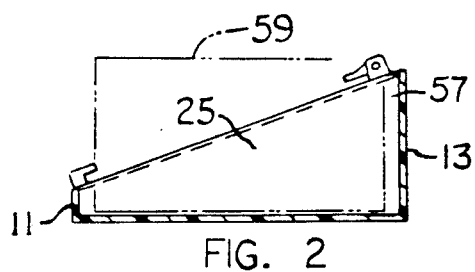
FIG. 2 is a transverse sectional view taken on line 2—2 in FIG. 1.

Section 27 of the rack body is comprised of a series of vertical partitions 55 extending between the front and rear edges 11 and 13 of the rack body, said partitions being spaced apart to form upwardly-open slots 57. Each slot is sized to receive an individual VCR cartridge. One such cartridge is designated by the dashed line 59 in FIG. 2. The VCR cartridges will be arranged on edge, with one longitudinal "title" edge facing upwardly. The VCR cartridges can be placed in slots 57 so that the titles of the cartridges are visible to a person sitting on a chair or couch near front edge 11 of the rack body. As shown in FIG. 2, the cartridges project above the upper edge of partitions, such that each cartridge can readily be removed from its slot 57 when necessary.

The rack body can be a relatively small structure adapted for positionment on a table near a chair or couch occupied by a person while watching a television set. In its preferred form, the rack body has a longitudinal dimension (along axis 19) that is at least twice the dimension measured along transverse axis 21.

I claim:

1. A rack structure comprising an elongated structural body having a longitudinal axis defining a front edge and a rear edge, and a transverse axis defining two side edges; said structural body having a flat upper face extending between its front and rear edges to support a TV program listing booklet in an opened condition; said flat upper face being slightly inclined from said front edge to said rear edge so that the opened booklet can be more easily read by a person seated near the front edge of the structural body; said structural body further comprising two upwardly-facing pocket structures located alongside said flat upper face; each pocket structure extending between the front and rear edges of the structural body so that each pocket structure has its major axis parallel to the transverse axis of the structural body; said pocket structures being adapted to support a TV remote controller and a VCR remote controller in parallelism with one another, with each controller having its signal transmission axis extending essentially horizontally along a line parallel to the transverse axis of the structural body, whereby each controller can be effectively operated while it is positioned in the associated pocket structure.

2. The rack structure of claim 1, wherein said flat upper face is inclined at approximately twenty degrees.

3. The rack structure of claim 1, and further comprising a booklet-retention strip extending along said flat upper face in near parallelism to said front edge, said strip having a lip spaced above the flat upper face to overlie the pages of an opened booklet resting on said upper face.

4. The rack structure of claim 3, and further comprising two pivotable clip structures mounted on said flat upper face in near proximity to said rear edge; each clip structure being swingable between a retracted position extending away from the flat upper face and an operating position extending along and above said upper face so as to overlie the pages of an opened booklet resting on said flat upper face.

5. The rack structure of claim 1, wherein each pocket structure comprises a flat surface adapted to underlie a remote controller and an upstanding rim wall bordering said flat surface to partially surround a controlling resting thereon.

6. The rack structure of claim 5, and further comprising flexible strap means anchored to a rim wall of each pocket structure for extension across each said pocket structure to prevent upward dislocation of a controller positioned within the respective pocket structure.

7. The rack structure of claim 1, wherein said structural body further comprises means for supporting a plural number of VCR tape cartridges alongside said flat upper face; said cartridge-support means comprising a series of vertical partitions extending between the front and rear edges of the structural body, said partitions being spaced apart to form upwardly-open slots adapted to receive individual VCR cartridges.

8. The rack structure of claim 7 wherein the dimension of the structural body along the longitudinal axis is at least twice the dimension measured along the transverse axis.

* * * * *